(12) United States Patent
Liu et al.

(10) Patent No.: US 7,826,199 B2
(45) Date of Patent: Nov. 2, 2010

(54) ELECTROCHEMICAL CAPACITOR WITH CARBON NANOTUBES

(75) Inventors: Chang-Hong Liu, Bei-Jing (CN); Shou-Shan Fan, Bei-Jing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 297 days.

(21) Appl. No.: 12/006,385

(22) Filed: Dec. 29, 2007

(65) Prior Publication Data
US 2009/0116171 A1  May 7, 2009

(30) Foreign Application Priority Data
Nov. 2, 2007  (CN)  .................. 2007 1 0124246

(51) Int. Cl.
*H01G 9/00* (2006.01)
*H01G 9/02* (2006.01)

(52) U.S. Cl. .................. 361/502; 361/512

(58) Field of Classification Search .............. 361/502, 361/503, 512
See application file for complete search history.

(56) References Cited

U.S. PATENT DOCUMENTS

| | | | |
|---|---|---|---|
| 4,725,926 A * | 2/1988 | Morimoto et al. ........... | 361/502 |
| 6,454,816 B1 * | 9/2002 | Lee et al. .................... | 29/25.03 |
| 6,599,808 B2 * | 7/2003 | Kim et al. .................... | 438/400 |
| 6,790,425 B1 | 9/2004 | Smalley et al. | |
| 7,147,966 B2 * | 12/2006 | Ren et al. .................... | 429/209 |
| 7,400,490 B2 * | 7/2008 | Gunderman et al. ........ | 361/502 |
| 7,553,341 B2 * | 6/2009 | Pan et al. .................... | 29/25.03 |
| 7,727,624 B2 * | 6/2010 | Cao et al. ................. | 428/315.5 |
| 2002/0008956 A1 | 1/2002 | Niu | |
| 2002/0048143 A1 | 4/2002 | Lee et al. | |
| 2002/0113335 A1 * | 8/2002 | Lobovsky et al. ........... | 264/184 |
| 2002/0172639 A1 | 11/2002 | Horiuchi et al. | |

(Continued)

FOREIGN PATENT DOCUMENTS

CN  1317809  10/2001

(Continued)

OTHER PUBLICATIONS

Du et al., Carbon Nanotube thin films with ordered structures, Dec. 8, 2004, Journal of Materials Chemistry, 15, 548-550.*

(Continued)

*Primary Examiner*—Eric Thomas
*Assistant Examiner*—David M Sinclair
(74) *Attorney, Agent, or Firm*—Jeffrey T. Knapp

(57) ABSTRACT

An electrolytic capacitor includes a first electrode, a second electrode opposite to the first electrode, a separator sandwiched between the first electrode and the second electrode, a cell accommodating the first electrode, the second electrode and the separator, and an electrolytic solution filled into the inner space of the cell, with the first electrode, the second electrode and the separator immersed into the electrolytic solution. The first electrode and second electrode are in a CNT film structure, wherein the CNT film includes a number of CNTs packed closely, substantially parallel to a surface of the CNT film, and isotropically arranged along a fixed direction or along random directions. The electrolytic capacitor is a high-performance capacitor.

14 Claims, 4 Drawing Sheets

U.S. PATENT DOCUMENTS

| | | | |
|---|---|---|---|
| 2003/0180472 A1* | 9/2003 | Zhou et al. | 427/430.1 |
| 2003/0185741 A1 | 10/2003 | Matyjaszewski et al. | |
| 2004/0053780 A1 | 3/2004 | Jiang et al. | |
| 2005/0002850 A1 | 1/2005 | Niu et al. | |
| 2005/0081983 A1 | 4/2005 | Nakayama et al. | |
| 2005/0083635 A1* | 4/2005 | Ooma et al. | 361/305 |
| 2006/0018018 A1* | 1/2006 | Nomura et al. | 359/495 |
| 2006/0098389 A1 | 5/2006 | Liu et al. | |
| 2007/0041887 A1 | 2/2007 | Veedu et al. | |
| 2007/0076349 A1 | 4/2007 | Dementiev et al. | |
| 2007/0148962 A1 | 6/2007 | Kauppinen et al. | |
| 2007/0166223 A1 | 7/2007 | Jiang et al. | |
| 2008/0018012 A1* | 1/2008 | Lemaire et al. | 264/82 |
| 2009/0272935 A1* | 11/2009 | Hata et al. | 252/70 |

FOREIGN PATENT DOCUMENTS

| | | | |
|---|---|---|---|
| CN | 1623210 | | 6/2005 |
| CN | 1770344 | | 5/2006 |
| JP | 02135719 A | * | 5/1990 |
| JP | 2003081622 A | * | 3/2003 |
| JP | 2005286008 | | 10/2005 |
| JP | 2007048907 | | 2/2007 |
| JP | 2007081384 | | 3/2007 |
| JP | 2007145634 | | 6/2007 |
| WO | WO 0040508 A1 | * | 7/2000 |
| WO | WO 0073204 A1 | * | 12/2000 |
| WO | WO2007047185 | | 4/2007 |
| WO | WO2007053155 | | 5/2007 |
| WO | WO2007078005 | | 7/2007 |
| WO | WO 2007078005 A1 | * | 7/2007 |

OTHER PUBLICATIONS

Gou, Single-walled nanotube bucky paper and nanocomposite, Jun. 19, 2006, Polymer International, 55, 1283-1288.*

Futaba et al., Shape-engineerable and highly densely packed single-walled carbon nanotubes and their application as super-capacitor electrodes, Nov. 26, 2006, Nature materials, vol. 5, 987-994.*

Frackowiak E et al, "Electrochemical storage of energy in carbon nanotubes and nanostructured carbons", Carbon, Elsevier, Oxford,GB, vol. 40, No. 10, Aug. 1, 2002, pp. 1775-1787.

* cited by examiner

ELECTROCHEMICAL CAPACITOR WITH CARBON NANOTUBES

RELATED APPLICATIONS

This application claims all benefits accruing under 35 U.S.C. §119 from China Patent Application No. 200710124246.X, filed on Nov. 2, 2007 in the China Intellectual Property Office. This application is related to commonly-assigned, co-pending application: U.S. patent application Ser. No. 12/006,317, entitled "ELECTROCHEMICAL CAPACITOR WITH CARBON NANOTUBES", filed Dec. 29, 2007 and U.S. patent application Ser. No. 12/006,304, entitled "ELECTROCHEMICAL CAPACITOR WITH CARBON NANOTUBES", filed Dec. 29, 2007.

BACKGROUND

1. Field of the Invention

The invention relates to capacitors, particularly, to a electrochemical capacitor with carbon nanotubes.

2. Discussion of Related Art

Conventionally, capacitors used in electric circuits includes electrolytic capacitor, ceramic capacitors, and like. Capacitors provide energy storage as other energy storage devices, such as batteries or fuel cells. Capacitors store energy in the electric field between two oppositely charged parallel plates, which are separated by an insulator. The amount of energy a capacitor can store increases as the area of conducting plate increases, the distance between the plates decreases, and the dielectric constant of the insulating material increases. The electrolytic capacitor stores energy by charge separation across a thin insulating oxide film that is often formed by a controlled electrolytic oxidation process at an appropriate metal. Generally, a volumetric capacitance density of electrolytic capacitor is improved by using porous electrodes to create a large effective plate area.

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). One of the characteristics of CNTs resides in that the aspect ratio of length to diameter is very large. In addition, the electric conductivity of carbon nanotubes is very high and allows a current flow at a current density of 100 MA/cm.sup.2 or more. Carbon nanotubes excel not only in electrical characteristics but also in mechanical characteristics. That is, the carbon nanotubes are distinctively tough, as attested by their Young's module exceeding 1 TPa, which belies their extreme lightness resulting from being formed solely of carbon atoms. Further, the carbon nanotubes have high elasticity, high resiliency and high chemical stability. These various and excellent characteristics tend to make CNTs ideal candidates for being used in field emission electronic devices, flat displays, as a hydrogen storage, and the like.

A new type of electrolytic capacitor using CNTs is disclosed. However, these CNTs are merely in contact with one another in a parent material. Therefore, it is difficult for the CNTs to provide stable electric conductivity and higher volumetric capacitance density.

What is needed, therefore, is a flexible electrolytic capacitor, which has stable and high electric conductivity, good charging/discharging property, and high volumetric capacitance density.

SUMMARY

An electrolytic capacitor includes a first electrode, a second electrode opposite to the first electrode, a separator sandwiched between the first electrode and the second electrode, a cell accommodating the first electrode, the second electrode and the separator, and an electrolytic solution filled into the inner space of the cell, with the first electrode, the second electrode and the separator immersed into the electrolytic solution. The first electrode and second electrode are a CNT film structure, wherein the CNT film includes a number of closely packed CNTs, which are substantially parallel to a surface of the CNT film, and isotropically arranged along a fixed direction or along random directions.

Compared with the conventional electrolytic capacitor, the present electrolytic capacitor has the following advantages: firstly, the CNT film has a high and stable electric conductive property, and the electrolytic capacitor has low internal resistance and good charging/discharging property. Secondly, the CNTs are uniformly dispersed in the CNT film, and thus the electrolytic capacitor has good reproducibility. Thirdly, the CNT film forms a porous structure, and then the interfacial surface area between the CNT film and the electrolytic solution is high, which results in a high energy density and volumetric capacitance density of the electrolytic capacitor. Fourthly, the CNT film is a thin and free-standing structure, and the electrolytic capacitor is flexible.

Other advantages and novel features of the present ion source element will become more apparent from the following detailed description of preferred embodiments when taken in conjunction with the accompanying drawings.

BRIEF DESCRIPTION OF THE DRAWINGS

Many aspects of the present electrolytic capacitor can be better understood with reference to the following drawings. The components in the drawings are not necessarily to scale, the emphasis instead being placed upon clearly illustrating the principles of the present f electrolytic capacitor.

Figure 1:
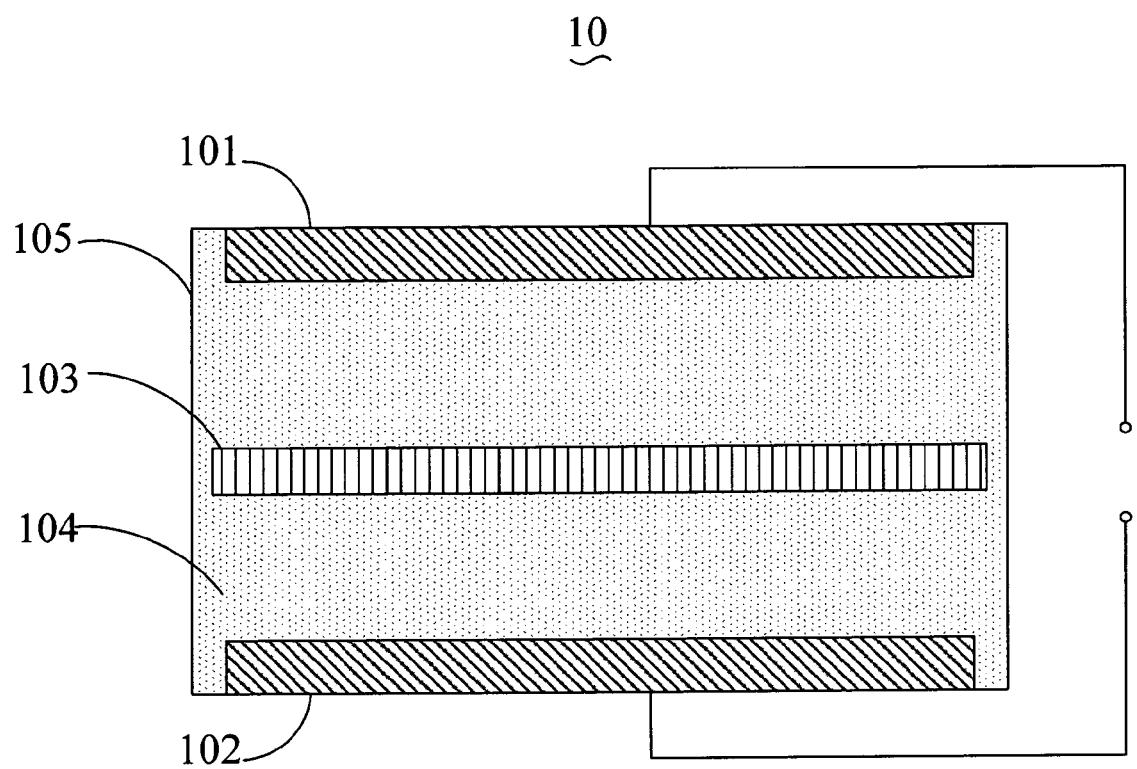
FIG. 1 is a schematic, cross-sectional view, showing the present electrolytic capacitor.

Corresponding reference characters indicate corresponding parts throughout the several views. The exemplifications set out herein illustrate at least one preferred embodiment of the present electrolytic capacitor, in one form, and such exemplifications are not to be construed as limiting the scope of the invention in any manner.

DETAILED DESCRIPTION OF PREFERRED EMBODIMENTS

Reference will now be made to the drawings to describe the preferred embodiments of the present electrolytic capacitor, in detail.

Referring to FIG. 1, an electrolytic capacitor 10 includes a first electrode 101, a second electrode 102 opposite to the first electrode 102, a separator 103 disposed between the first electrode 101 and the second electrode 102, an electrolytic solution 104 and a cell 105 accommodating all above elements therein.

The inner space of the cell 105 is filled with the electrolytic solution 104, and the first electrode 101, the second electrode 102 and the separator 103 are immersed into the electrolytic solution 104.

The separator 103 is an insulating porous material, composed of polymer material such as polyethylene, polypropylene, and polyolefin, or of nonwoven fiber material such as cellulose, polyester, and polypropylene. The separator 103 is configured for preventing electrical contact between the first electrode 101 and second electrode 102 and allowing the ions therethrough.

The electrolytic solution 104 can be anyone of known electrolytic solutions used in electrochemical capacitors, such as aqueous electrolytic solution or organic electrolytic solution.

The first electrode 101 and second electrode 102 are a CNT film structure. The CNT film includes a plurality of closely packed CNTs, which are substantially parallel to a surface thereof. The CNTs are uniformly dispersed in the CNT film, and thus the electrolytic capacitor 10 has good reproducibility. The CNTs are isotropically arranged along a fixed direction or along random directions, and the adjacent CNTs are attracted with and connected to each other by van der Waals attractive force. Thus, the CNT film has a high and stable electric conductive property, and the electrolytic capacitor 10 has low internal resistance and good charging/discharging property. In addition, the CNT film forms a porous structure with a pore size of less than 1 micrometer, and then the interfacial surface area between the CNT film and the electrolytic solution 104 is high, which results in a high energy density and volumetric capacitance density of the electrolytic capacitor 10. Since the CNT film is in a thin and free-standing structure, the first electrode 101 and second electrode 102 can be flexible, and then the electrolytic capacitor 10 can be formed like a thin and flexible film, which make the electrolytic capacitor 10 can be employable in IC cards, portable device, etc.

Figure 2:
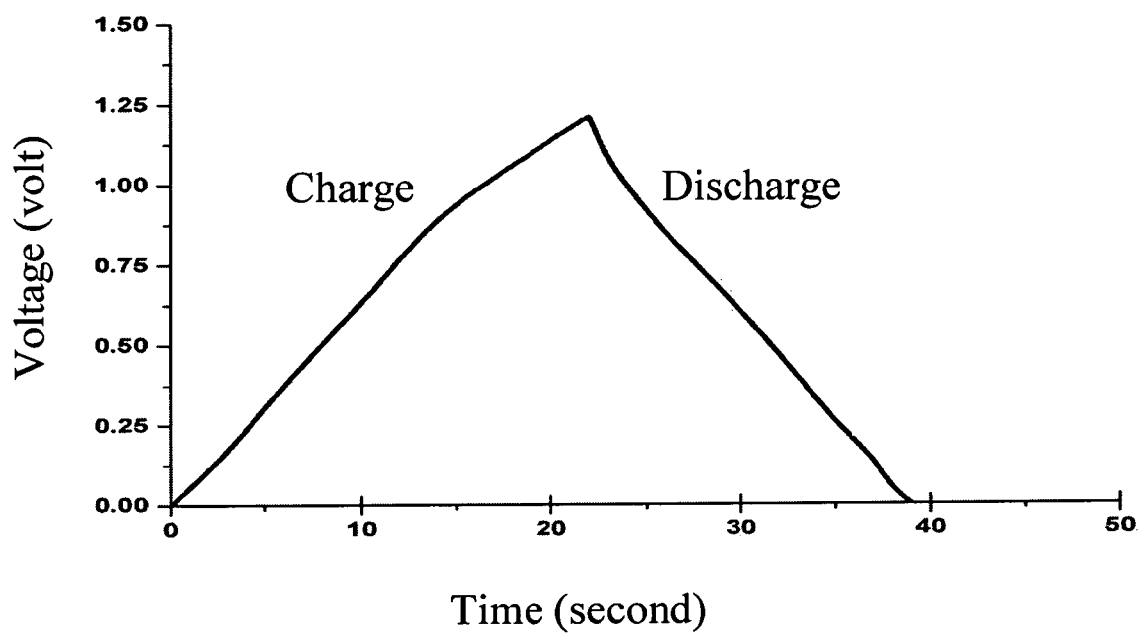
FIG. 2 is a charging/discharging graph of the present electrolytic capacitor.

Referring to FIG. 2, the charging/discharging graph of the present electrolytic capacitor shows a symmetrical structure under a current of 3 microamperes, and the present electrolytic capacitor has a good reproducibility. The volumetric capacitance density thereof is more than 100 farads per gram.

A length and width of the CNT film is not limited and can be determined according to practical needs. For preventing from the current leakage, a thickness of the CNT film is determined in a proper range. In the present embodiment, the thickness of the CNT film is in an approximate range from 1 micron to 1 millimeter.

The CNT film is formed by the following steps: (1) providing a super-aligned CNT array on a substrate; (2) pressing the CNT array along a fixed direction or along random directions perpendicular to the substrate and (3) removing the substrate from the CNT array, and finally achieving a free-standing CNT film.

In step (1), the super-aligned CNT is grown using a chemical vapor deposition method. The method is described in U.S. Pat. No. 7,045,108, which is incorporated herein by reference. Firstly, a substrate is provided, and the substrate is a substrate of p type silicon or n type silicon. Secondly, a catalyst layer is deposited on the substrate. The catalyst layer is made of a material selected from a group consisting of iron (Fe), cobalt (Co), nickel (Ni), and their alloys. Thirdly, the substrate with the catalyst layer is annealed at a temperature in an approximate range from 300 to 400 degrees centigrade under a protecting gas for about 10 hours. Fourthly, the substrate with the catalyst layer is heated to approximately 500 to 700 degrees centigrade and a mixed gas including a carbon containing gas and a protecting gas is introduced for about 5 to 30 minutes to grow a super-aligned CNTs array. The carbon containing gas can be a hydrocarbon gas, such as acetylene or ethane. The protecting gas can be an inert gas. The grown CNTs are aligned parallel in columns and held together by van der Waals force interactions. The CNTs array has a high density and each one of the CNTs has an essentially uniform diameter.

The super-aligned CNT array can, opportunely, have a height above 100 micrometers and include a plurality of CNTs parallel to each other and approximately perpendicular to the substrate. Because the length of the CNTs is very long, portions of the CNTs are bundled together. Moreover, because the super-aligned CNT array grown by the above conditions is essentially free of impurities such as carbonaceous or residual catalyst particles, and the CNTs in the super-aligned array are closely packed together by the van der Waals attractive force.

Figure 3:
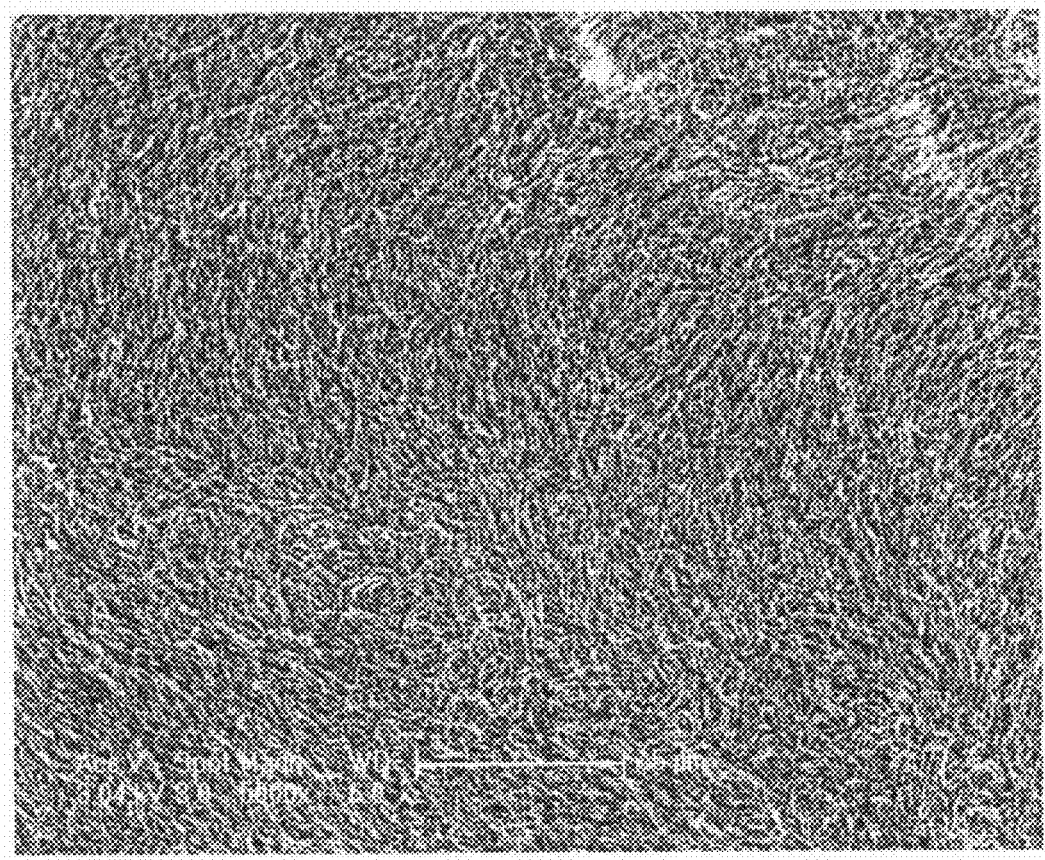
FIG. 3 is a Scanning Electron Microscope (SEM) photo, showing a CNT film of a first embodiment.
Figure 4:
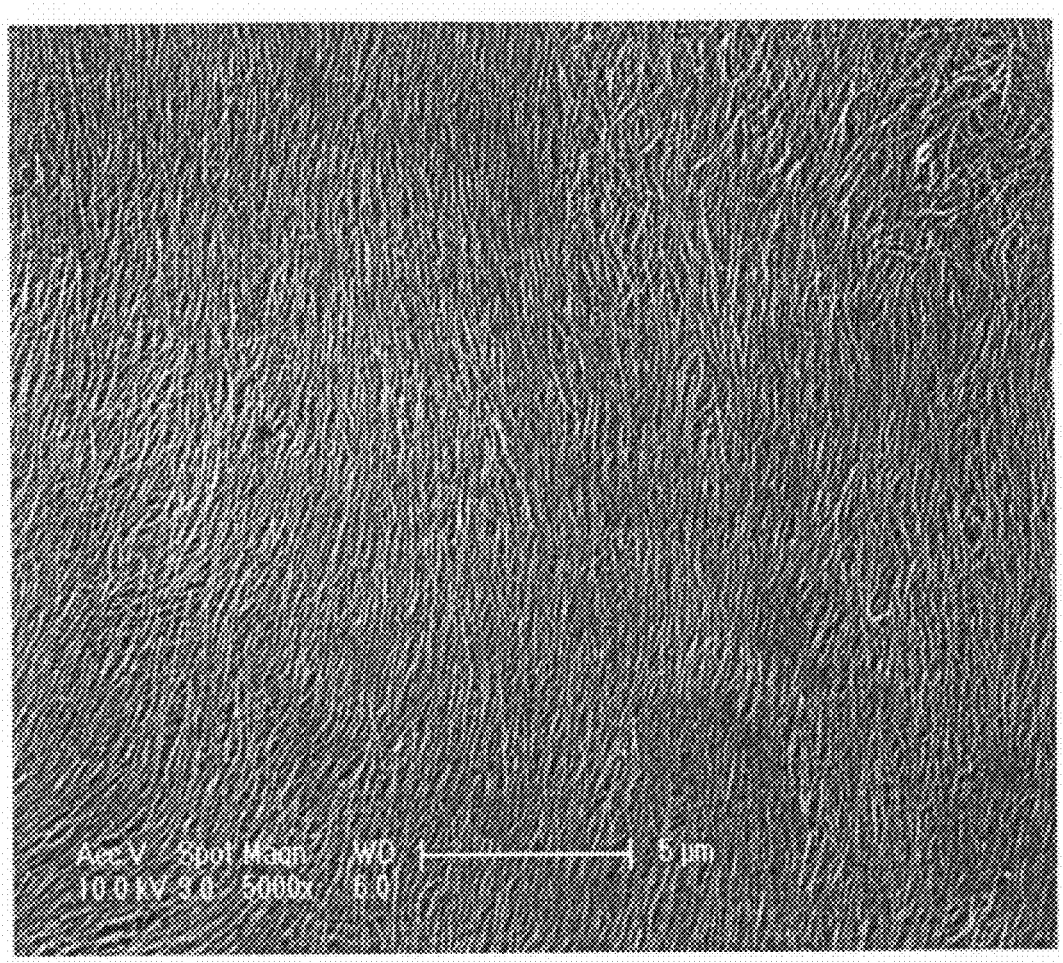
FIG. 4 is a SEM photo, showing a CNT film of a second embodiment.

In step (2), a certain pressure is applied to the CNT array to press them by a pressing device. The pressing device can, advantageously, be a pressure head with a glossy surface. It is to be understood that, the shape of the pressure head and the pressing direction can, opportunely, determine the direction of the CNTs collapsing therein. When a planar pressure head is used, the CNT array is pressed with the glossy surface of the pressure head opposite to the substrate, and along random directions perpendicular to the substrate. Then, a CNT film having a number of CNT isotropically arranged as shown in FIG. 3 can advantageously, be obtained. When a roller-shaped pressure head is used, the CNT array is pressed with the glossy surface of the pressure head opposite to the substrate, and along a fixed direction perpendicular to the substrate, and a CNT film having a number of CNT isotropically arranged as shown in FIG. 4 can advantageously, be obtained.

It is to be understood that, a degree of the slant of the CNTs to the substrate is related to the pressure applied thereon. The greater the pressure, the greater the degree of slant. A thickness of the CNT film is opportunely determined by the height of the CNT array and the pressure applied on the CNT array. That is, the higher the height of the carbon nanotube array and the less the pressure, the larger the thickness of the carbon nanotube film.

In step (3), the substrate can be removed by a mechanical method or a chemical method. The CNT film with the CNTs uniformly dispersed therein has good mechanical strength and tensile strength, thereby can be easy in practical application.

Furthermore, before step (3) or after step (3), the CNT array with the substrate can be treat by an organic solvent, as described in U.S. Pat. Pub. No. 2007/0166223. Since the untreated CNT array has a high surface area to volume ratio, and thus may easily become stuck to other objects. That is, the CNT array is soaked in the organic solvent, and then is take out thereof. After the organic solvent volatilizing, due to factors such as surface tension, the CNT array is shrunk. Therefore, the stickiness of the CNT film is lowered or eliminated, and strength and toughness of the CNT film is improved. The organic solvent may be a volatilizable organic solvent, such as ethanol, methanol, acetone, dichloroethane, chloroform, and any combination thereof.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An electrolytic capacitor comprising:
a first electrode;
a second electrode opposite to the first electrode;
a separator sandwiched between the first electrode and the second electrode;
a cell accommodating the first electrode, the second electrode and the separator;
an electrolytic solution filled into an inner space of the cell, with the first electrode, the second electrode and the separator immersed into the electrolytic solution;
wherein at least one of the first electrode and the second electrode is a CNT film comprising a CNT array with collapsing CNTs therein, all the CNTs are closely packed together by van der Waals attractive force, the CNT film is a free-standing film due to the van der Waals attractive force between the CNTs, and the CNTs are substantially parallel to a surface of the CNT film, and arranged along random directions.

2. The electrolytic capacitor as claimed in claim 1, wherein the CNTs in the CNT array are collapsed by applying a pressure head on an original CNT array grown on a substrate, the original CNT array comprising the CNTs parallel to each other and approximately perpendicular to the substrate.

3. The electrolytic capacitor as claimed in claim 1, wherein the CNTs are uniformly dispersed in the CNT film.

4. The electrolytic capacitor as claimed in claim 1, wherein the separator is an insulating porous material.

5. The electrolytic capacitor as claimed in claim 4, wherein the separator is made of a material selected from the group consisting of polymer material and nonwoven fiber material.

6. The electrolytic capacitor as claimed in claim 5, wherein the polymer material is selected from the group consisting of polyethylene, polypropylene, and polyolefin.

7. The electrolytic capacitor as claimed in claim 5, wherein the nonwoven fiber material is selected from the group consisting of cellulose, polyester, and polypropylene.

8. The electrolytic capacitor as claimed in claim 1, wherein the CNT film is a porous structure.

9. The electrolytic capacitor as claimed in claim 8, wherein a pore size of the porous structure of the CNT film is less than 1 micrometer.

10. The electrolytic capacitor as claimed in claim 1, wherein the CNT film is a flexible film.

11. The electrolytic capacitor as claimed in claim 1, wherein a thickness of the CNT film is in an approximate range from 1 micrometer to 1 millimeter.

12. The electrolytic capacitor as claimed in claim 1, wherein the CNTs of the CNT film have a height of about 100 micrometers.

13. The electrolytic capacitor as claimed in claim 1, wherein a volumetric capacitance density is more than 100 farads per gram.

14. The electrolytic capacitor as claimed in claim 1, wherein the CNT film is formed by pressing an aligned CNT array to collapse the CNTs therein.

* * * * *